(No Model.)
M. SCHUMACHER.
LAND ROLLER.
No. 419,892. Patented Jan. 21, 1890.
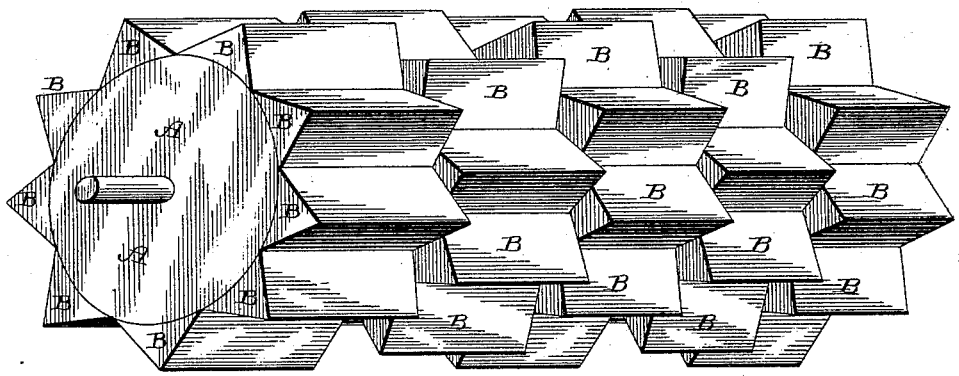
Witnesses:
E. P. Ellis,
A. Stevens Pattison
Inventor:
M. Schumacher,
per F. A. Lehmann,
Atty.

UNITED STATES PATENT OFFICE.

MATHIAS SCHUMACHER, OF BUXTON, (DAKOTA TERRITORY,) NORTH DAKOTA.

LAND-ROLLER.

SPECIFICATION forming part of Letters Patent No. 419,892, dated January 21, 1890.

Application filed September 27, 1889. Serial No. 325,306. (No model.)

*To all whom it may concern:*

Be it known that I, MATHIAS SCHUMACHER, of Buxton, in the county of Traill and State of North Dakota, have invented certain new and useful Improvements in Land-Rollers; and I do hereby declare the following to be a full, clear, and exact description of the invention, such as will enable others skilled in the art to which it pertains to make and use it, reference being had to the accompanying drawing, which forms part of this specification.

My invention relates to an improvement in land-rollers; and it consists in a roller having a cylindrical body, upon the surface of which are formed a number of short triangular ridges or projections which are set staggering in relation to each other, as will be more fully described hereinafter.

The object of my invention is to provide a roller which is intended especially for protecting the soil and the seed which have been sown by leaving the surface of the ground roughened or broken in into small short ridges, pockets, or hollows, so as to prevent the soil from being blown away by the great wind-storms which prevail in some portions of the country, and which sweep away all of the surface of the ground which has been rolled smooth in the usual manner.

The accompanying drawing represents a perspective of a roller which embodies my invention.

A represents the body of the roller, which is cylindrical in shape, and to the surface of which are secured or formed in any suitable manner a number of triangular ridges or projections B. These ridges or projections are arranged in groups which extend entirely around the roller, and one group is set out of line with or staggering in relation to the other, as shown, so that each group will form short ridges, pockets, or depressions in the surface of the ground, so as to provide the ground with pockets having vertical walls or abutments to catch the sand and pebbles instead of in continuous grooves or ridges or smooth, in the usual manner. These ridges not only serve to break up the clods, but to compress the ground tightly upon the seed which have been sown, and which leaves the surface of the ground in such a shape that the soil cannot be blown away by the high winds which prevail in Dakota, and where the ground is dry and parched for the want of rain for weeks at a time. Where the ordinary smooth roller is used in that portion of the country the soil is blown away by the high-wind storms, which leave even the grain which has been planted uncovered. Where the ground is left in a roughened condition by a roller constructed as here shown the ground is packed upon the seed and the depressions in the earth serve to catch the flying sand and dirt and to stop its motion without itself being blown away. The roller does not simply prevent the surface of the earth from being blown away, but it protects the seed in the ground, so that the sand-storms have no effect upon them. These pockets also serve to catch rain as it falls and to hold it, so that a greater portion of it sinks into the earth than is possible where the ground is rolled perfectly smooth, in the usual manner, or when the ground is formed into round ridges, which has been heretofore done.

Having thus described my invention, I claim—

A land-roller consisting of a circular body provided with a series of short angular projections placed out of line with each other, whereby depressions or pockets are formed in the ground having end walls for catching the moving sand, substantially as shown and described.

In testimony whereof I affix my signature in presence of two witnesses.

MATHIAS SCHUMACHER.

Witnesses:
 JAMES GRASSICK,
 OLE. A. HONG.